(12) United States Patent
Gubanov et al.

(10) Patent No.: US 10,789,431 B2
(45) Date of Patent: Sep. 29, 2020

(54) METHOD AND SYSTEM OF TRANSLATING A SOURCE SENTENCE IN A FIRST LANGUAGE INTO A TARGET SENTENCE IN A SECOND LANGUAGE

(71) Applicant: YANDEX EUROPE AG, Lucerne (CH)

(72) Inventors: Sergey Dmitrievich Gubanov, Tambov (RU); Anton Aleksandrovich Dvorkovich, Moscow (RU); Boris Andreevich Kovarsky, Bratsk (RU); Mikhail Alekseevich Nokel, Moscow (RU); Aleksey Anatolievich Noskov, Kaluga (RU); Anton Viktorovich Frolov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 228 days.

(21) Appl. No.: 16/031,021

(22) Filed: Jul. 10, 2018

(65) Prior Publication Data
US 2019/0205396 A1    Jul. 4, 2019

(30) Foreign Application Priority Data
Dec. 29, 2017   (RU) ................. 2017146884

(51) Int. Cl.
| G06F 40/44 | (2020.01) |
| G06F 40/58 | (2020.01) |
| G06F 40/51 | (2020.01) |
| G06F 40/30 | (2020.01) |
| G06F 40/42 | (2020.01) |

(52) U.S. Cl.
CPC ............. *G06F 40/58* (2020.01); *G06F 40/30* (2020.01); *G06F 40/42* (2020.01); *G06F 40/44* (2020.01); *G06F 40/51* (2020.01)

(58) Field of Classification Search
CPC ........... G06F 40/44; G06F 40/58; G06F 40/51
See application file for complete search history.

(56) References Cited

U.S. PATENT DOCUMENTS

| 8,326,598 B1 | 12/2012 | Macherey et al. |
| 8,977,536 B2 | 3/2015 | Och |

(Continued)

FOREIGN PATENT DOCUMENTS

| CN | 105068998 A | 11/2015 |
| CN | 106844352 A | 6/2017 |
| CN | 107038159 A | 8/2017 |

OTHER PUBLICATIONS

English Abstract for CN105068998 retrieved on Espacenet on May 3, 2018.

(Continued)

*Primary Examiner* — Bryan S Blankenagel
(74) *Attorney, Agent, or Firm* — BCF LLP

(57) ABSTRACT

A method and system for translating a source sentence in a first language into a target sentence in a second language is disclosed. The method comprises acquiring the source sentence and generating, a first translation hypothesis and a second translation model. A first score value is assigned to the first translation hypothesis, the first score value being representative of a likelihood of the first translation hypothesis is one of a semantically illogical translation. A second score value is assigned to the first translation hypothesis, the second score value being representative of an expected difference in translation quality between the first translation hypothesis and the second translation hypothesis. The target sentence corresponds to: the first translation hypothesis, upon determining that both the first score value and the second score value meet a condition; and the second translation hypothesis, upon determining that the condition is not met.

17 Claims, 8 Drawing Sheets

(56) References Cited

U.S. PATENT DOCUMENTS

| | | | |
|---|---|---|---|
| 9,201,871 | B2 | 12/2015 | He et al. |
| 9,519,858 | B2 | 12/2016 | Zweig et al. |
| 9,959,272 | B1* | 5/2018 | Canĕk .................... G06F 40/44 |
| 2005/0055217 | A1* | 3/2005 | Sumita .................... G06F 40/45 704/277 |
| 2008/0133245 | A1* | 6/2008 | Proulx .................... G06F 40/55 704/277 |
| 2008/0306727 | A1 | 12/2008 | Thurmair et al. |
| 2013/0006954 | A1* | 1/2013 | Nikoulina ............... G06F 40/44 707/706 |
| 2014/0365200 | A1* | 12/2014 | Sagie ..................... G06F 40/51 704/2 |
| 2016/0179790 | A1* | 6/2016 | Watanabe ............. G06F 16/313 704/7 |
| 2016/0267077 | A1 | 9/2016 | Bahgat et al. |
| 2016/0358071 | A1 | 12/2016 | Grefenstette et al. |
| 2017/0031901 | A1* | 2/2017 | Song ...................... G06F 40/58 |
| 2017/0220559 | A1* | 8/2017 | Fujiwara ................. G06F 40/58 |
| 2017/0293611 | A1* | 10/2017 | Tu .......................... G06F 3/0482 |
| 2017/0371866 | A1* | 12/2017 | Eck .......................... G06F 40/49 |
| 2019/0087417 | A1* | 3/2019 | Wang ...................... G06F 40/53 |
| 2019/0197117 | A1* | 6/2019 | Saeki .................... G06F 40/289 |

OTHER PUBLICATIONS

Wang et al., "Neural Machine Translation Advised by Statistical Machine Translation", Proceedings of the Thirty-First AAAI Conference on Artificial Intelligence (AAAI-17), 2017, pp. 3330-3336.

Devlin et al., "Fast and Robust Neural Network Joint Models for Statistical Machine Translation", Proceedings of the 52nd Annual Meeting of the Association for Computational Linguistics, 2014, USA, pp. 1370-1380.

Rikters, "Neural Network Language Models for Candidate Scoring in Hybrid Multi-System Machine Translation", Proceedings of the Sixth Workshop on Hybrid Approaches to Translation, 2016, Japan, pp. 8-15.

Liu et al., "Additive Neural Networks for Statistical Machine Translation", Proceedings of the 51st Annual Meeting of the Association for Computational Linguistics, 2013, Bulgaria, pp. 791-801.

He et al., "Improved Neural Machine Translation with SMT Features", Proceedings of the Thirtieth AAAI Conference on Artificial Intelligence (AAAI-16), 2016, China, pp. 151-157.

English Abstract for CN106844352 retrieved on Espacenet on May 3, 2018.

English Abstract for CN107038159 retrieved on Espacenet on May 3, 2018.

"Omniscien Technologies Announces Release of Language Studio with Next-Generation Neural Machine Translation Technology", 5 pages, https://omniscien.com/omniscien-technologies-announces-release-language-studio-next-generation-neural-machine-translation-technology/.

"One model is better than two. Yandex.Translate launches a hybrid machine translation system", Yandex Blog, 2017, 2 pages, https://yandex.com/company/blog/one-model-is-better-than-two-yu-yandex-translate-launches-a-hybrid-machine-translation-system/.

"Neural machine translation", Wikipedia, 4 pages, https://en.wikipedia.org/wiki/Neural_machine_translation.

* cited by examiner

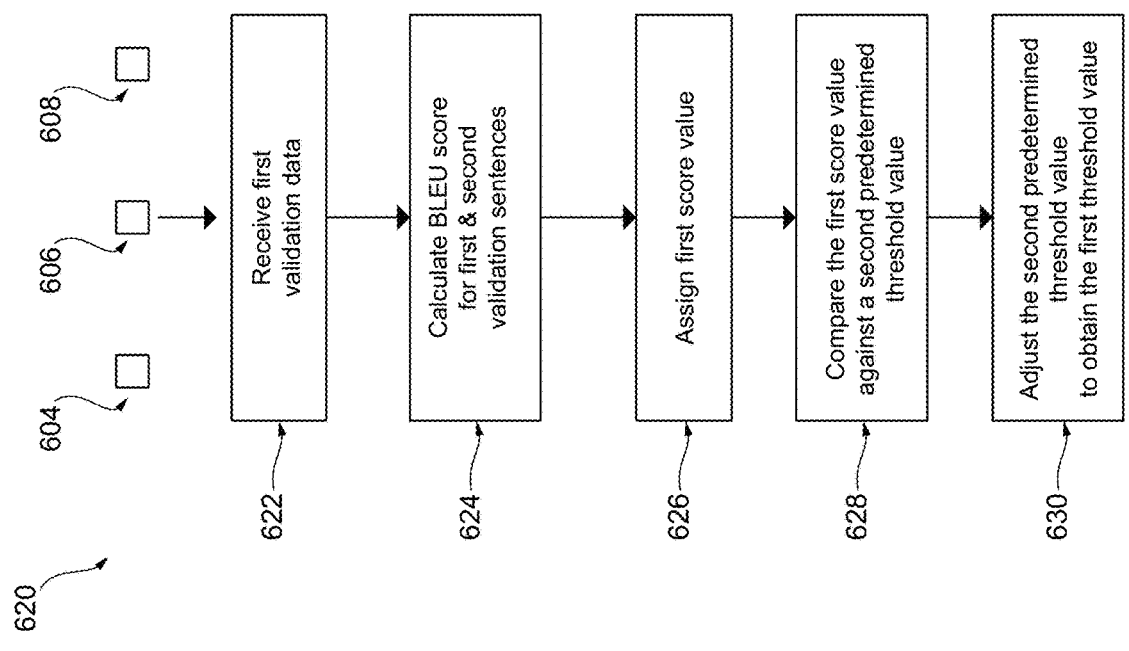
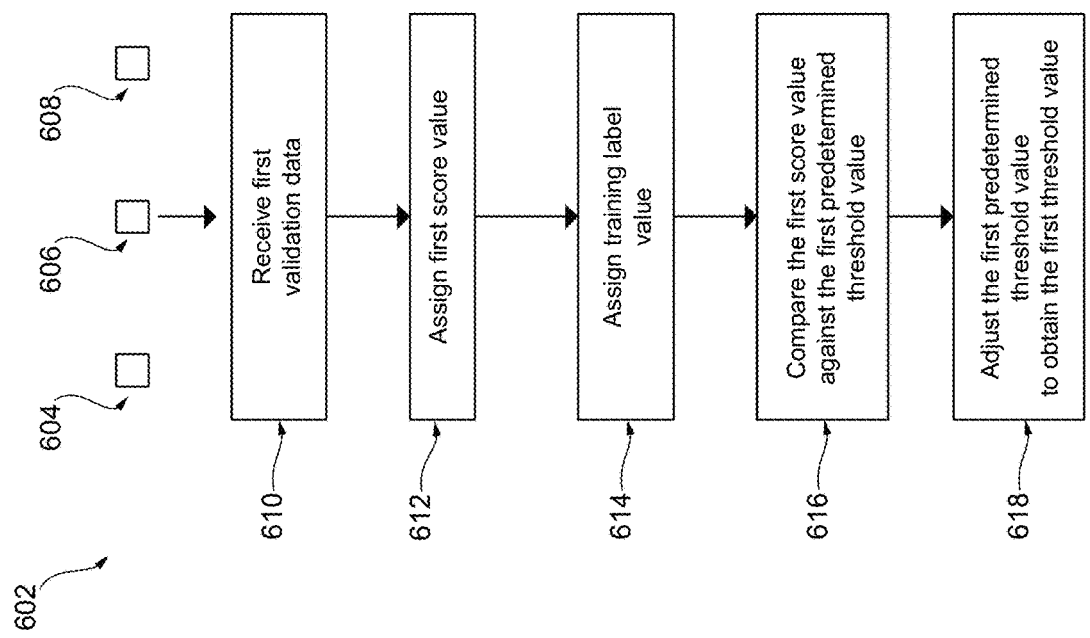
Fig. 6

METHOD AND SYSTEM OF TRANSLATING A SOURCE SENTENCE IN A FIRST LANGUAGE INTO A TARGET SENTENCE IN A SECOND LANGUAGE

CROSS-REFERENCE

The present application claims priority to Russian Patent Application No. 2017146884, entitled "Method and System of Translating a Source Sentence in a First Language into a Target Sentence in a Second Language", filed Dec. 29, 2017, the entirety of which is incorporated herein by reference.

FIELD

The present technology generally relates to machine translation, and more particularly, to a system and method for translating a source sentence in a first language into a target sentence in a second language.

BACKGROUND

With the growth of users accessing the Internet, a vast amount of Internet based services has surfaced. Such services include, for example, search engine service (such as Yandex™, Google™, and the like), social network service (such as Facebook™) multimedia service (such as, Instagram™ and YouTube™), and translation service (such as Yandex.Translate™). The latter service has been particularly useful in allowing users to easily translate a text (or even a speech) from one natural language (usually one that a given user is not fully understanding) into another (usually one that the given user understands).

The automatic translation of a text from one language into another is a topic with growing interests, especially with the advance in computer technology. Indeed, the recent advances in the ability for the computer to rapidly process a variety of information while using less memory space have contributed to the significant improvement in the field of machine translation.

One commonly known machine translation method is the statistical machine translation (SMT). The SMT is configured to execute statistical analysis for translating one text in a first language to a second language. Generally speaking, the pros of the SMT are the abundant availability of bilingual text corpora to train the SMT. However, although the accuracy of SMT for text written in short (or simple) sentences may be acceptable, the accuracy of translation of the SMT for text written in long (or complex) sentences falls due to its inability to properly translate the context of the text.

Another type of machine translation method that is used is the neural machine translation (NMT) which uses a large neural network. The NMT has been considered to be a promising approach at addressing the shortcomings of the SMT, as the NMT has the ability to learn, in an end-to-end fashion, the mapping from an inputted text to its translated output text.

Although the NMT provides a better translation accuracy when compared to the STM, there are some shortcomings as well. For example, the NMT has difficulty in translating rare words from one language into another, which often results in nonsensical translations.

U.S. Pat. No. 9,201,871 B2 (published Dec. 15, 2011) discloses a joint optimization strategy for combining translation hypotheses from multiple machine-translation systems. Decisions on word alignment, between the hypotheses, ordering, and selection of a combined translation output are made jointly in accordance with a set of features. Additional features that model alignment and ordering behaviour are also provided and utilized.

CN 105068998A discloses a translation method and apparatus based on a neural network model. The translation method based on the neural network model includes: acquiring a sentence in a source language; encoding a sentence in the original language to obtain a vector sequence; predicting the corresponding candidate words in the target language word by word on the basis of the vector sequence; and predicting candidate words to generate the target language statement. The method and apparatus for translation based on the neural network model in the embodiments of the present invention can perform translation in combination with various translation features and improve the translation quality, fluency and readability of the translation result.

SUMMARY

It is an object of the present technology to provide improved method and systems for translating a source sentence in a first language into a target sentence in a second language. As such, the present technology aims at translating the source sentence into the target sentence in a manner that overcomes the shortcomings provided by the conventional NMTs and SMTs.

In developing the present technology, developers noted that it is possible to create a translation system that uses both the NMT and SMT in which their respective strengths are used in a complementary manner to obtain a higher quality translation.

Without wishing to be bound to any specific theory, embodiments of the present technology have been developed based on an assumption that by using two trained classifiers, it is possible to substitute the NMT-based translation that is determined to be semantically illogical or poor quality, with the SMT-based translation to maintain an overall acceptable translation quality of the text.

According to a broad aspect of the present technology, there is provided a computer implemented method for translating a source sentence in a first language into a target sentence in a second language. The method is executable by a computer device, the method comprising: acquiring the source sentence; generating, by a first translation model, a first translation hypothesis; generating, by a second translation model, a second translation hypothesis, the second translation model being different from the first translation model; assigning, by a first classifier, a first score value to the first translation hypothesis, the first score value being representative of a likelihood of the first translation hypothesis is one of a semantically illogical translation or a semantically logical translation within the second language; the first classifier having been trained to determine the first score value based on an analysis of a triples of data comprising: the source sentence; the first translation hypothesis; and the second translation hypothesis; assigning by a second classifier, a second score value to the first translation hypothesis, the second score value being representative of an expected difference in translation quality between the first translation hypothesis and the second translation hypothesis, the second classifier having been trained to determine the second score value based on an analysis of the triples of data. The method further comprises generating the target sentence, the target sentence corresponding to: the first translation hypothesis, upon determining that both the first score value and the second score value meet a condition against a first threshold and a second threshold respectively; and the second translation hypothesis, upon determining that the condition is not met.

In some embodiments, the first translation model is a neural network machine translation model and the second translation model is a phrase-based statistical translation model.

In some embodiments, determining that both the first score value and the second score value meet the condition against the first threshold and the second threshold respectively comprises: determining that the first score value is below the first threshold; and determining that the second score value is below the second threshold.

In some embodiments, the first classifier has been previously trained on a training data comprising at least a training sentence marked as semantically logical or illogical, and is configured to determine if the triples of data is indicative of one off a higher degree of likelihood of the first translation hypothesis being semantically illogical, or a lower degree of likelihood of the first translation hypothesis being semantically illogical within the second language In some embodiments, the training sentence is a first training sentence in the second language, and wherein the training data further comprises a training source sentence in the first language and a second training sentence in the second language; and wherein: the first training sentence is generated by the first translation model based on the training source sentence; the second training sentence is generated by the second translation model based on the training source sentence; and training the first classifier further comprises: assigning a binary label value to the first training sentence by a human assessor, the binary label value being one of a first binary label value and a second binary label value, the first binary label value being indicative of the first training sentence being semantically illogical, and the second binary label value being indicative of the first training sentence being semantically logical; generating an inferred function based on the training source sentence, first training sentence, the second training sentence, and the binary label value assigned to the second training sentence, wherein the inferred function is configured to assign the first score value to the first translation hypothesis based on the triples of data.

In some embodiments, assigning the first score value to the first translation hypothesis based on the triples of data comprises: determining a set of features associated with the triples of data, the set of features comprising at least one of: an alignment feature, the alignment feature being indicative of a lexical correspondence between words contained within the source sentence, the first translation hypothesis and the second translation hypothesis; a language model score feature, the language model score feature being associated with a language model score assigned to each of the first translation hypothesis and the second translation hypothesis by a language model; a bilingual phrase table feature, the bilingual phrase table feature being indicative of phrase correspondence between phrases contained within the source sentence, the first translation hypothesis and the second translation hypothesis, each of the phrase correspondence further comprising a co-occurrence likelihood within a parallel corpus; a repetition feature, the repetition feature being associated with a presence of repetition of a given word within the first translation hypothesis; a ratio of length feature, the ratio of length feature being associated with a ratio of the length of word sequences in the source sentence and each of the first and second translation hypotheses; and based on the determined set of features, assigning the first score value to the first translation hypothesis.

In some embodiments, the first threshold is predetermined, and wherein the method further comprises adjusting the threshold by: receiving a set of source validation sentences in the first language; generating, by the first translation model, a set of first validation translation; generating, by a second translation model, a set of second validation translation; assigning the binary label value to each of the first validation translation in the set of first validation translation by a human assessor; assigning the first score value by the first classifier to each of the first threshold translation; determining a number of validation errors, the number of validation errors corresponding to the number of first validation translations with the first label value having been assigned a first score value below the predetermined first threshold; adjusting to lower the first threshold, upon determining the number of validation errors being above a predetermined validation threshold.

In some embodiments, the second classifier has been trained on at least a quadruples of data comprising: a training source sentence in the first language; a first training sentence, the first training sentence being generated by the first translation model based on the training source sentence; a second training sentence, the second training sentence being generated by the second translation model based on the training source sentence; a human translated sentence corresponding to the training source sentence translated into the second language by a human assessor; and wherein training the second classifier comprises: calculating a first translation quality score of the first training sentence based on the human translated sentence; calculating a second translation quality score of the second training sentence based on the human translated sentence; generating a quality difference score value, the quality difference score value corresponding to a subtraction of the first translation quality score from the second translation quality score; generating an inferred function configured to assign the second score value, the inferred function being generated based on a regression analysis of the quality difference score value, the first training sentence, the second training sentence, and the training source sentence.

In some embodiments, at least one the first translation quality score and the second translation quality is a bilingual evaluation understudy (BLEU) score.

In some embodiments, the computing device is a server coupled to a client device via a communication network; acquiring the source sentence comprises receiving the source sentence from the client device; and the method further comprises: transmitting the target sentence to the client device.

In another broad aspect of the present technology, there is provided a server translating a source sentence in a first language into a target sentence in a second language, the server comprising a processor configured to: acquire the source sentence; generate, by a first translation model, a first translation hypothesis; generate, by a second translation model, a second translation hypothesis, the second translation model being different from the first translation model; assign, by a first classifier, a first score value to the first translation hypothesis, the first score value being representative of a likelihood of the first translation hypothesis is one of a semantically illogical translation or a semantically logical translation within the second language; the first classifier having been trained to determine the first score value based on an analysis of a triples of data comprising: the source sentence; the first translation hypothesis; and the second translation hypothesis; assign by a second classifier, a second score value to the first translation hypothesis, the second score value being representative of an expected difference in translation quality between the first translation hypothesis and the second translation hypothesis; the second classifier having been trained to determine the second score value based on an analysis of the triples of data; generate the target sentence, the target sentence corresponding to: the first translation hypothesis, upon determining that both the first score value and the second score value meet a condition against a first threshold and a second threshold respectively; and the second translation hypothesis, upon determining that the condition is not met.

In some embodiments, the first translation model a neural network machine translation model and the second translation model is a phrase-based statistical translation model.

In some embodiments, to determine that both the first score value and the second score value meet the condition against the first threshold and the second threshold respectively, the processor is configured to: determine that the first score value is below the first threshold; and determine that the second score value is below the second threshold.

In some embodiments, the first classifier has been previously trained on a training data comprising at least a training sentence marked as semantically logical or illogical, and the processor is configured to determine if the triples of data is indicative of one off a higher degree of likelihood of the first translation hypothesis being semantically illogical, or a lower degree of likelihood of the first translation hypothesis being semantically illogical within the second language.

In some embodiments, the training sentence is a first training sentence in the second language, and wherein the training data further comprises a training source sentence in the first language and a second training sentence in the second language; and wherein: the first training sentence is generated by the first translation model based on the training source sentence; the second training sentence is generated by the second translation model based on the training source sentence; and wherein to train the first classifier, the processor is further configured to: assign a binary label value to the first training sentence by a human assessor, the binary label value being one of a first binary label value and a second binary label value, the first binary label value being indicative of the first training sentence being semantically illogical, and the second binary label value being indicative of the first training sentence being semantically logical; generate an inferred function based on the training source sentence, first training sentence, the second training sentence, and the binary label value assigned to the second training sentence, wherein: the inferred function is configured to assign the first score value to the first translation hypothesis based on the triples of data.

In some embodiments, to assign the first score value to the first translation hypothesis based on the triples of data, the processor is configured to: determine a set of features associated with the triples of data, the set of features comprising at least one of: an alignment feature, the alignment feature being indicative of a lexical correspondence between words contained within the source sentence, the first translation hypothesis and the second translation hypothesis; a language model score feature, the language model score feature being associated with a language model score assigned to each of the first translation hypothesis and the second translation hypothesis by a language model; a bilingual phrase table feature, the bilingual phrase table feature being indicative of phrase correspondence between phrases contained within the source sentence, the first translation hypothesis and the second translation hypothesis, each of the phrase correspondence further comprising a co-occurrence likelihood within a parallel corpus; a repetition feature, the repetition feature being associated with a presence of repetition of a given word within the first translation hypothesis; a ratio of length feature, the ratio of length feature being associated with a ratio of the length of word sequences in the source sentence and each of the first and second translation hypotheses; and based on the determined set of features, assign the first score value to the first translation hypothesis.

In some embodiments, the threshold is predetermined, and wherein the processor is further configured to adjust the threshold, the threshold being adjusted by the processor configured to: receive a set of source validation sentences in the first language; generate, by the first translation model, a set of first validation translation; generate, by a second translation model, a set of second validation translation; assign the binary label value to each of the first validation translation in the set of first validation translation by a human assessor; assign the first score value by the first classifier to each of the first threshold translation; determine a number of validation errors, the number of validation errors corresponding to the number of first validation translations with the first label value having been assigned a first score value below the predetermined first threshold; adjust to lower the first threshold, upon determining the number of validation errors being above a predetermined validation threshold.

In some embodiments, the second classifier has been trained on at least a quadruples of data comprising: a training source sentence in the first language; a first training sentence, the first training sentence being generated by the first translation model based on the training source sentence; a second training sentence, the second training sentence being generated by the second translation model based on the training source sentence; a human translated sentence corresponding to the training source sentence translated into the second language by a human assessor; and wherein to train the second classifier, the processor is configured to: calculate a first translation quality score of the first training sentence based on the human translated sentence; calculate a second translation quality score of the second training sentence based on the human translated sentence; generate a quality difference score value, the quality difference score value corresponding to a subtraction of the first translation quality score from the second translation quality score; generate an inferred function configured to assign the second score value, the inferred function being generated based on a regression analysis of the quality difference score value, the first training sentence, the second training sentence, and the training source sentence.

In some embodiments, at least one the first translation quality score and the second translation quality is a bilingual evaluation understudy (BLEU) score.

In some embodiments, the server is coupled to a client device via a communication network, and comprises a communication interface to acquire the source sentence from the client device; and the processor is further configured to: transmit the target sentence to the client device.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 6 depicts an example of two methods of determining a first threshold value.

DETAILED DESCRIPTION

Figure 1:
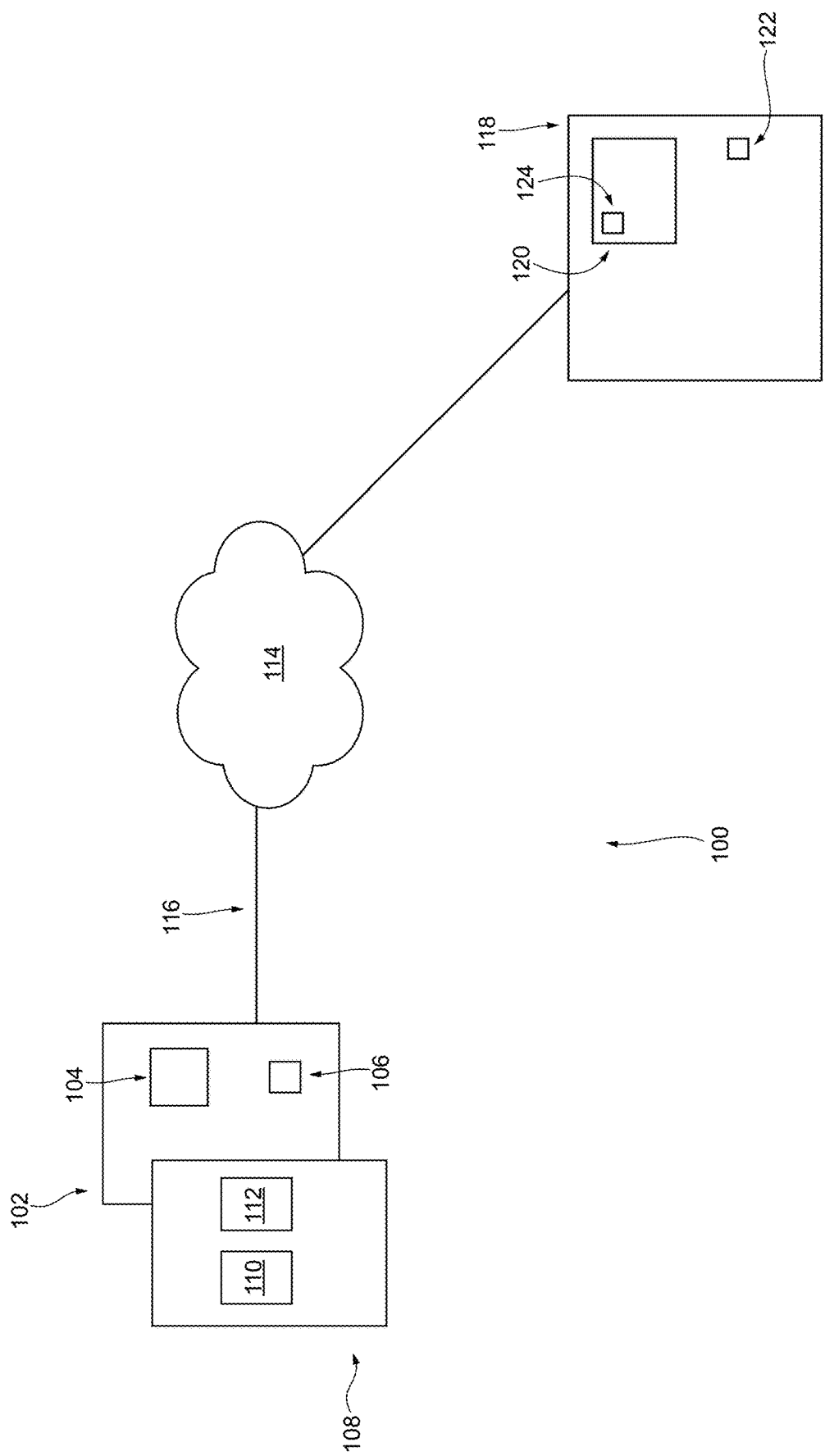
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art, to access a translation service 108. Generally speaking, the purpose of the translation service 108 is to enable the user (not shown) to translate a corpus of text in a first language into a second language (described below). To that end, the translation service 108 comprises a translation input area 110 and a translation output area 112.

How the translation service 108 is implemented is not particularly limited. One example of the translation service 108 may be embodied in the user (not shown) accessing, via a browsing application (not shown) a web site associated with a translation service (such as Yandex.Translate™) to access the translation service 108. For example, the translation service 108 can be accessed by typing in a uniform resource locator (URL) associated with Yandex.Translate™. It should be expressly understood that the translation service 108 can be accessed using any other commercially available or proprietary on-line translation service.

In alternative non-limiting embodiments of the present technology, the translation service 108 may be implemented as a downloadable application on an electronic device (such as a wireless communication device or a stationary electronic device). For example, where the electronic device 102 is implemented as a portable device, such as for example, Samsung™ Galaxy™ S5, the electronic device 102 may be executing a Yandex.Translate™ application. It should be expressly understood that any other commercially available or proprietary translation application can be used for implementing non-limiting embodiments of the present technology.

Generally speaking, the electronic device 102 comprises a user input interface (not shown) (such as a keyboard, touch screen, mouse, and the like) for receiving user inputs into, for example, the translation input area 110. How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

The electronic device 102 is coupled to a communication network 114 via a communication link 116. In some non-limiting embodiments of the present technology, the communication network 114 can be implemented as the Internet. In other embodiments of the present technology, the communication network 114 can be implemented differently, such as any wide-area communications network, local-area communications network, a private communications network and the like.

How the communication link 116 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means, examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 114) via the communication network 114.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments of the present technology, the server 118 can be operated by the same entity that has provided the afore-described electronic translation service 108. For example, the server 118 can be operated by Yandex LLC of Lev Tolstoy Street, No. 16, Moscow, 119021, Russia. In alternative embodiments, the server 118 can be operated by an entity different from the one providing the aforementioned electronic translation service 108.

In some embodiments of the present technology, the server 118 executes a translation application 124. The manner in which the translation application 124 is implemented is described in detail below. For now, suffice to say that the translation application 124 is configured to receive and execute the translation of a corpus of text, entered by the user (not shown) into the translation input area 110, from a first language into a user-selected second language. The translation application 124 is further configured to transmit the generated translation to the electronic device 102, to be displayed to the user of the electronic device 102 via the translation output area 112.

Figure 2:
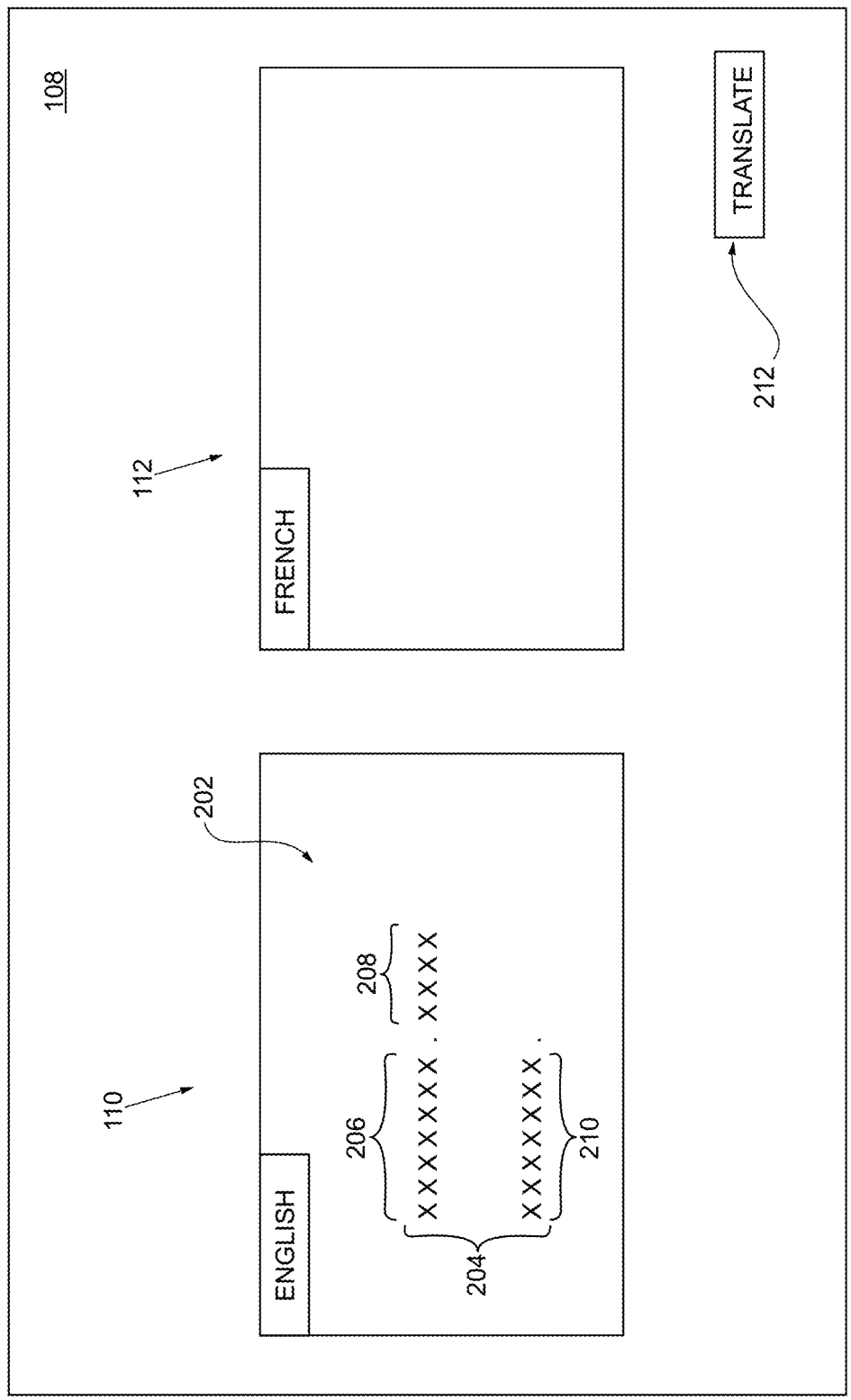
FIG. 2 depicts a screenshot of a translation service executed by the electronic device of the system of FIG. 1.

With brief reference to FIG. 2, which depicts a screenshot of the translation service 108 including an input text 202 within the translation input area 110. In some embodiments, the input text 202 is a natural language text written in a first language (in this case, English). The manner in which the input text 202 is inputted into the translation input area 110 is not limited, and may for example be user inputted via the user input interface (not shown) or via a copy-paste from (for example) a network resource such as a web page (not shown).

The input text 202 is made up of a plurality of sentences 204, the plurality of sentences 204 comprising a number of individual sentences, such as a first sentence 206, a second sentence 208, and a third sentence 210. Although in the depicted illustration, the plurality of sentences 204 are separated by a full stop (i.e. a period), a person skilled in the art would understand that this is not always the case, and other punctuation marks, such as a question mark, an exclamation point may separate the plurality of sentences 204. For the avoidance of any doubt, it should be mentioned that the input text 202 (and more specifically each letter) is represented by an "X", however, in reality the individual sentences are made of words in a given language (in this case, English). For example, the first sentence 206 can be: "With the year coming to the end, the young lawyer was trying to attain his target billable hours".

In some embodiments, the translation service 108 comprises a user-actuation button 212 which is configured to execute the translation of the input text 202 into a user-selected language (in this case, French) which will be displayed on the translation output area 112. Needless to say, although in the given example, the translation service 108 is illustrating a translation of an English text into a French text, it is not limited as such, and may be configured to translate from any language to any another.

Figure 3:
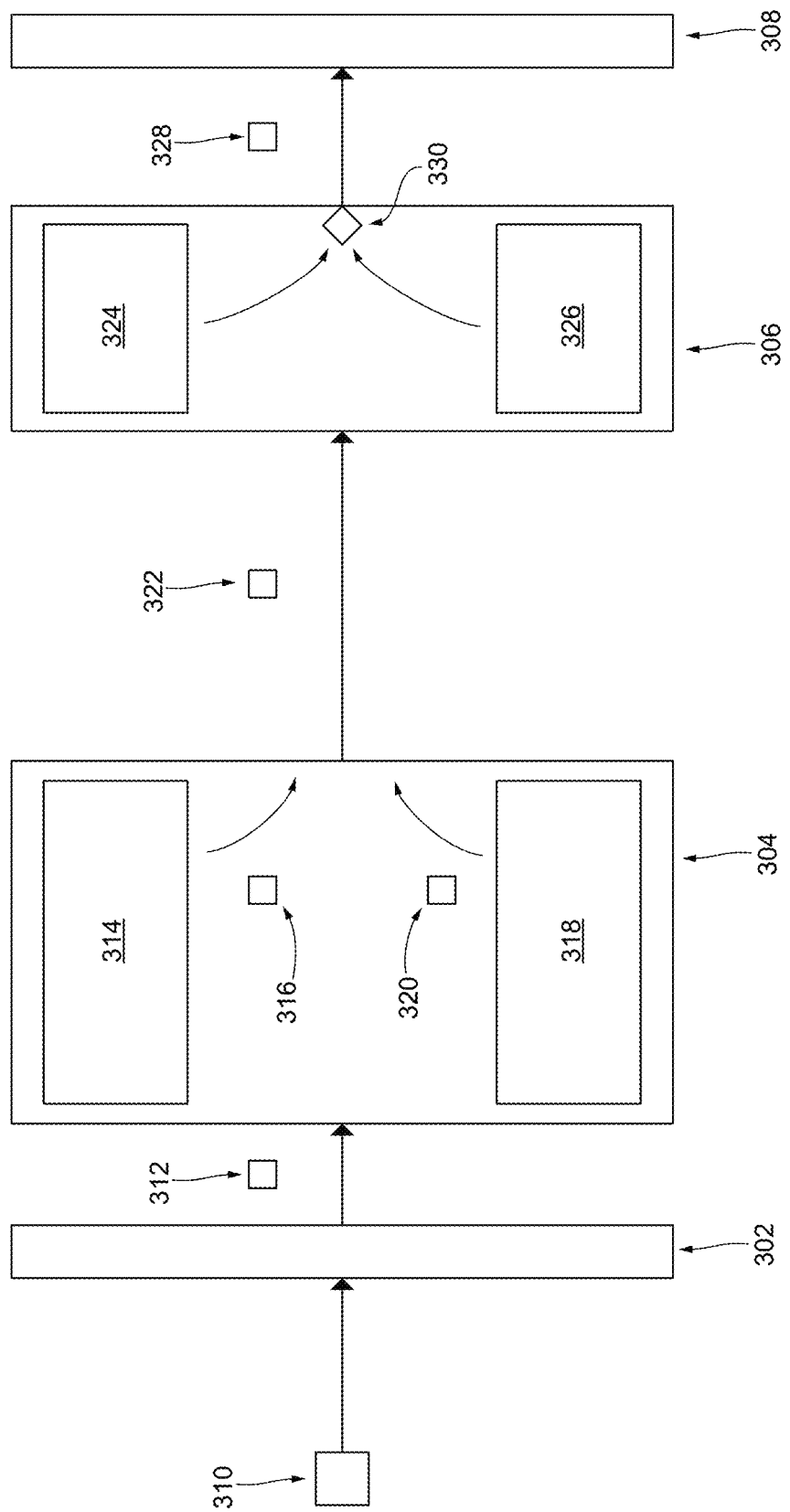
FIG. 3 depicts an example of a process of translating a source sentence in a first language into a target sentence in a second language.

Functions and operations of the various components of the translation application 124 will now be described in more details. With reference to FIG. 3, there is depicted a schematic illustration of the translation application 124 for translating the input text 202 received by the electronic device 102 in response to, for example, the user actuating the user-actuation button 212. The translation application 124 executes (or otherwise has access to): a parsing routine 302, a translation routine 304, a classifying routine 306, and a text building routine 308.

In the context of the present specification, the term "routine" refers to a subset of the computer executable program instructions of the translation application 124 that is executable by the server processor 122 to perform the functions explained below in association with the various routines (the parsing routine 302, the translation routine 304, the classifying routine 306, and the text building routine 308). For the avoidance of any doubt, it should be expressly understood that the parsing routine 302, the translation routine 304, the classifying routine 306 and the text building routine 308 are illustrated schematically herein in a separate and distributed manner for ease of explanation of the processes executed by the translation application 124. It is contemplated that some or all of the parsing routine 302, the translation routine 304, the classifying routine 306 and the text building routine 308 may be implemented as one or more combined routines.

For ease of understanding the present technology, functionality of each one of the parsing routine 302, the translation routine 304, the classifying routine 306 and the text building routine 308, as well as data and/or information processed or stored therein are described below.

Parsing Routine

The parsing routine 302 is configured to receive a data packet 310, which comprises the input text 202, from the electronic device 102.

The parsing routine 302 is configured to parse the plurality of sentences 204 into one or more individual sentences, such as the first sentence 206, the second sentence 208, and the third sentence 210. The manner in which the parsing is done is well known in the art and is not limited, and may for example be done by analyzing punctuation marks and applying grammatical rules. In some embodiments, the parsing routine 302 uses language-specific rules (i.e. rules specifically selected for the language of the input text 202). Even through embodiments of the present technology have been described using the parsing routine 302 to parse the plurality of sentences 204 into individual sentences, in alternative embodiments of the present technology it is contemplated that the parsing routine 302 can parse the plurality of sentences 204 into sub-units of sentences (such as partial sentences). As such, it is contemplated that the parsing routine 302 can be further configured to parse the plurality of sentences 204 into groups of words, such as phrases, within each parsed sentence.

Translation Routine

Once the input text 202 has been parsed into individual sentences, the parsing routine 302 is configured to transmit a data packet 312 to the translation routine 304. The data packet 312 comprises one of the parsed individual sentences, such as for example, the first sentence 206 (which can also be thought as a "source sentence").

The translation routine 304 is configured to execute two translation models, namely a neural network (NN) translation model 314 (which can also be thought as a "first translation model") and a phrase-based statistical (PBS) translation model 318 (which can also be thought as a "second translation model").

The manners in which the NN translation model 314 and the PBS translation model 318 are implemented are known in the art and therefore will not be described in detail herein. Suffice to say that in response to receiving the data packet 312, the translation routine 304 is configured to generate a first translation hypothesis 316 using the NN translation model 314, and a second translation hypothesis 320 using the PBS translation model 318. Once the first translation hypothesis 316 and the second translation hypothesis 320 have been generated, the translation routine 304 is configured to transmit a data packet 322 to the classifying routine 306. The data packet 322 comprises the first sentence 206, the first translation hypothesis 316 and the second translation hypothesis 320.

Classifying Routine

The classifying routine 306 is configured to execute two classifiers, namely a first classifier 324 and a second classifier 326. The first classifier 324 has been trained (described below) to assign a first score value to the first translation hypothesis 316. The first score value is representative of a likelihood of the first translation hypothesis 316 being one of a semantically illogical translation or a semantically logical translation within the second language.

More precisely, the first classifier 324 is configured to analyze a set of features (described below) associated with a triple of data, which comprises the first sentence 206 (i.e. the source sentence), the first translation hypothesis 316 and the second translation hypothesis 320, to determine a likelihood that the first translation hypothesis 316 is nonsensical within the second language.

The manner in which the first score value is implemented is not limited, and may for example be implemented as a value between a scale of 0 to 1. For example, the first score value that is close to 1 is indicative of a higher degree of likelihood of the first translation hypothesis 316 being semantically illogical and the first score value that is closer to 0 is indicative of a lower degree of likelihood of the first translation hypothesis 316 being semantically illogical (or vice-versa). Needless to say, the first score value may be implemented differently, such as a percentage value, or any other scale.

The second classifier 326 has been trained (described below) to assign a second score value to the first translation hypothesis 316. The second score value is representative of an expected difference in translation quality between the first translation hypothesis 316 and the second translation hypothesis 320. In other words, the second classifier 326 is trained to predict the translation quality difference based on the context of the triples of data (i.e. the first sentence 206 (i.e. the source sentence), the first translation hypothesis 316 and the second translation hypothesis 320).

More precisely, the second classifier 326 is configured to analyze the triples of data (i.e. the first sentence 206 (i.e. the source sentence), the first translation hypothesis 316 and the second translation hypothesis 320) to predict the expected difference in translation quality between the first translation hypothesis 316 and the second translation hypothesis 320. This is based on the assumption of the developers that even though the translations generated by the NN translation model 314 are generally of a better quality compared to translations generated by the PBS translation model 318, there is a possibility that the translation generated by the NN translation model 314 may happen to be of a worse quality translation, whereas, translations generated by the PBS translation model 318 provides a stable quality translation. As such, by using the second translation hypothesis 320 as a benchmark, the second score value is indicative of the expected difference in translation quality between the first translation hypothesis 316 and the second translation hypothesis 320 (described below) based on context of triple of data being analyzed.

The manner in which the second score value is implemented is not limited, and may for example be implemented as a value between a scale of −1 to 1. Thus, if the second score value is close to 1, it is indicative that the translation quality of the second translation hypothesis 320 is expected to be better than the first translation hypothesis 316, and if the second score value is closer to −1, it is indicative that the translation quality of the first translation hypothesis 316 is expected to be better than the second translation hypothesis 320 (or vice-versa). Needless to say, the second score value may be implemented differently, such as a percentage value, or a value between 0 and 1, or any other scale.

Once the first score value and the second score value have been assigned to the first translation hypothesis 316, the classifying routine 306 is configured to determine if the first score value and the second score value meet at least one condition logic 330. For example, determining whether the first score value and the second score value meet the at least one condition logic 330 may comprise determining that both (i) the first score value is below a first threshold value (described below); and (ii) the second score value is below a second threshold value (described below).

If the first score value or the second score value are both below the first threshold value and the second threshold value respectively, the first translation hypothesis 316 is selected to be transmitted, via a data packet 328, to the text building routine 308.

If however, at least one of the first score value or the second score value is below the first threshold value and second threshold value respectively, the second translation hypothesis 320 is selected to be transmitted to the text building routine 308 via the data packet 328.

Text Building Routine

The text building routine 308 is configured to receive the data packet 328 and retrieve the translation hypothesis included therein (i.e. either one of the first translation hypothesis 316 and second translation hypothesis 320). The text building routine 308 is further configured to consider the translation hypothesis included therein to be a translation into the target sentence of the source sentence (i.e. the first sentence 206) within the second language.

Once all the sentences included within the input text 202 (i.e. the first sentence 206, the second sentence 208 and the third sentence 210) have been translated (using the above described method), the text building routine 308 is configured to compile all the selected translation hypotheses and generate a translated text (not shown). The text building routine 308 is then configured to transmit the output text to the electronic device 102 to be outputted in the translation output area 112.

It should be understood that the translated text (not shown) of the input text 202 that has three sentences (referring to FIG. 2) that is generated using the above described translation application 124 would also comprise three target sentences (each corresponding to the first sentence 206, the second sentence 208, and the third sentence 210), which are each individually generated by either the NN translation model 314 or the PBS translation model 318. Thus for example, the translated text may comprise a first and a third target sentences (that correspond to a translation of the first sentence 206 and the third sentence 210, respectively) generated by the NN translation model 314, and a second target sentence (that correspond to a translation of the second sentence 208) generated by the PBS translation model 318.

Having described the in-use phase of the translation application 124, the manner in which the first classifier 324 and the second classifier 326 are trained will now be described.

Training the First Classifier

Figure 4:
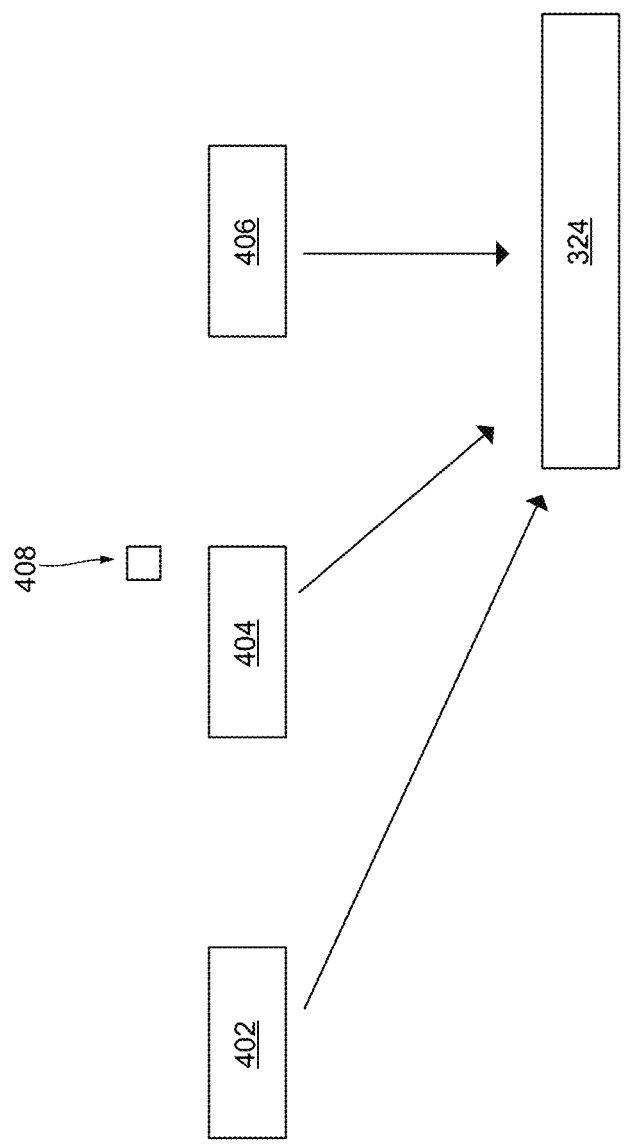
FIG. 4 depicts a schematic diagram of training a first classifier of FIG. 3.

With reference to FIG. 4, there is provided a schematic illustration depicting the training process of the first classifier 324.

As has been alluded to above, the first classifier 324 is trained to assign, during the in-use phase, the first score value to a translation hypothesis generated by the NN translation model 314, based on the set of features associated with the source sentence (i.e. the first sentence 206 in the example above), the first translation hypothesis 316 and the second translation hypothesis 320.

The first classifier 324 is trained using a first training data comprising a quadruple of data, namely a training source sentence 402, a first training sentence 404, a second training sentence 406 and a label 408 associated with the first training sentence 404.

The training source sentence 402 corresponds to a sentence written in the first language. The first training sentence 404 is a translation (in the second language) of the training source sentence 402 generated by the NN translation model 314. The second training sentence 406 is a translation (in the second language) of the training source sentence 402 generated by the PBS translation model 318. The label 408 is assigned to the first training sentence 404 by a human assessor (not shown), and is indicative of the first training sentence 404 being one of semantically illogical or semantically logical sentence within the second language. In some embodiments, the label 408 is a binary label value, where a first binary label value (such as 1) is indicative of the first training sentence 404 being semantically illogical, and a second binary label value (such as 0) is indicative of the first training sentence 404 being semantically logical (or vice-versa).

The first training data is inputted into the first classifier 324. The first classifier 324 comprises a training logic to determine a set of features associated with the training source sentence 402, the first training sentence 404 and the second training sentence 406. In some embodiments, the set of features are representative of various properties of the training source sentence 402, the first training sentence 404 and the second training sentence 406.

Needless to say, although there is only depicted a single instance of the first training data, it is done so for ease of illustration. It should be expressly understood that the training of the first classifier 324 is done iteratively using a plurality of different sets of the first training data.

In some embodiments, the set of features computed by the first classifier 324 may include, but is not limited to, the following:
  i. an alignment feature;
  ii. a language model score feature;
  iii. a bilingual phrase table feature;
  iv. a repetition feature; and
  v. a ratio of length feature.

Each of the above-mentioned features will now be explained in detail.

(i) The Alignment Feature

The first classifier 324 is configured to build a first bitext alignment of words contained within the training source sentence 402 and the words contained within the first training sentence 404 as well as a second bitext alignment of words contained within the training source sentence 402 and the words contained within the second training sentence 406 using an alignment model.

As such, the alignment feature is indicative of the lexical correspondence between the training source sentence 402 and the first training sentence 404 and the second training sentence 406, respectively.

(ii) The Language Model Score Feature

The first classifier 324 is configured to assign a language model score to each of the first training sentence 404 and the second training sentence 406 using a language model (not shown). The manner in which the language model is implemented is known in the art and will not be described in detail herein.

As such, the language model score feature is indicative of the likelihood of the first training sentence 404 and the second training sentence 406 being a valid sentence in the second language regardless of whether or not they bear any relationship to the training source sentence 402.

(iii) The Bilingual Phrase Table Feature

The first classifier 324 is configured to parse each of the training source sentence 402, the first training sentence 404 and the second training sentence 406 into phrases, a phrase being a meaningful entity comprising a group of two or more words (such as "modern computer systems", "information retrieval methods", "wooden chairs", and the like).

The manner in which the first classifier 324 is configured to identify a phrase is not limited. For example, the first classifier 324 may be configured to identify a group of words that has a logical meaning. In the context of the present technology, the term "logical meaning" refers to the semantic associated with a lexical morpheme. In some embodiments, the first classifier 324 is configured to determine if a given group of words has a logical meaning based on the grammatical type of the word included therein. For example, the first classifier 324 is configured to identify lexical morphemes such as verbs, adjectives, and adverbs, as having a logical meaning. On the other hand, words that are grammatical morphemes (which specify a relationship between other morphemes such as prepositions, articles, conjunctions, and the like) are considered as not having a logical meaning by the first classifier 324. Thus, if a group of words contains at least one word with a logical meaning, the first classifier 324 is configured to identify the group of words as a phrase.

Once the training source sentence 402, the first training sentence 404 and the second training sentence 406 have been parsed into phrases, the first classifier 324 is configured to build a first table comprising pairs of phrases from the training source sentence 402 and the first training sentence 404, as well as a second table comprising pairs of phrases from the training source sentence 402 and the second training sentence 406.

The first classifier 324 is further configured to assign a co-occurrence score value to each of the pairs of phrases. In some embodiments, the co-occurrence score value represents the likelihood that a given pair of phrases co-occurs within previously seen parallel corpora.

As such, the bilingual phrase table feature is indicative of the phrase correspondence and their co-occurrence between the training source sentence 402, against the first training sentence 404 and the second training sentence 406, respectively (iv) The Repetition Feature The first classifier 324 is configured to determine the presence of a repeating word within the first training sentence 404.

As such, the repetition feature is indicative of the presence of one or more repeating words within the first training sentence 404.

(v) The Ratio of Length Feature

The first classifier 324 is configured to determine a first ratio of a number of words contained in the training source sentence 402 and the number of words contained within the first training sentence 404, as well as a second ratio of the number of words contained within the training source sentence 402 and the number of words contained within the second training sentence 406.

In other words, the ratio of length feature is indicative of how many words are generated by the NN translation model 314 and the PBS translation model 318 based on the training source sentence 402.

Once the set of features for the training source sentence 402, the first training sentence 404 and the second training sentence 406 has been determined, the first classifier 324 is configured analyze the set of features.

More precisely, recalling that the first training data contains the label 408 that is indicative of the first training sentence 404 being semantically logical or illogical, the first classifier 324 is configured to learn, what set of features is indicative of the first training sentence 404 being semantically illogical.

Accordingly, the first classifier 324 is configured to generate a first inferred function, which is configured to assign the first score value to the first translation hypothesis 316 during the in-use phase, based on the set of features associated with the source sentence (i.e. the first sentence 206), the first translation hypothesis 316 and the second translation hypothesis 320.

Returning to FIG. 3 (the in-use phase), if the first set of features associated with the source sentence (i.e. the first sentence 206), the first translation hypothesis 316 and the second translation hypothesis 320, is determined to be indicative of the first translation hypothesis 316 to have a high degree of likelihood of being semantically illogical, the first classifier 324 is configured to assign the first score value indicative as such (i.e. a value closer to 1). Alternatively, if the set of features is determined to be indicative of the first translation hypothesis 316 to have a low likelihood of being semantically illogical, the first classifier 324 is configured to assign the first score value indicative as such (i.e. a value closer to 0).

Now, having described the manner in which the first classifier 324 is trained prior to the in-use phase, attention will now be turned to the manner in which the first threshold value is determined.

First Threshold Value

As has been explained above, the first score value assigned by the first classifier 324 is compared against the first threshold value. With reference to FIG. 6, there is provided a schematic illustration depicting two methods for determining the first threshold value. In the illustrated embodiments, the first threshold value is determined empirically.

A first method 602 to determine the first threshold value is now explained. The first method 602 starts at step 610 where the first classifier 324 receives a first validation data. The first validation data comprises (i) a source validation sentence 604 in the first language, (ii) a first validation translation 606 which is the translation of the source validation sentence 604 generated by the NN translation model 314, and (iii) a second validation translation 608 which is the translation of the source validation sentence 604 generated by the PBS translation model 318.

At step 612, the first classifier 324 assigns the first score value to the first validation translation 606 based on the set of features associated with the source validation sentence 604, the first validation translation 606, and the second validation translation 608.

At step 614, a human assessor (not shown) assigns a training label value to the first validation translation 606. Similar, to the label 408 (see FIG. 4), the training label value can be a binary label value, where the first label value (ex. 1) is indicative of the first validation translation 606 to be semantically illogical in the second language, and the second label value (ex. 0) is indicative of the first validation translation 606 to be semantically logical in the second language.

At step 616, the first score value assigned to the first validation translation 606 is compared against a first predetermined threshold value. For example, recalling that the first score value is a numerical value between 1 and 0, the first predetermined threshold value may correspond to 0.9.

At step 618, based on the first score value assigned to the first validation translation 606 the human assessor validates the first predetermined threshold value.

More precisely, the human assessor determines if there is a need to adjust the first predetermined threshold value due to a first validation error (described below) of the first validation translation 606 based on the first score value assigned in step 616 and the training label value assigned in step 614.

For example, the first validation error can occur if the first validation translation 606 has (i) the first score value below the first predetermined threshold value, but (ii) the assigned training label is 1. This is caused because the first predetermined threshold value is too low, and therefore the first predetermined threshold value will be increased, resulting in the first threshold value.

Alternatively, another first validation error can occur if the first validation translation 606 has (i) the first score value above the first predetermined threshold value, but (ii) the assigned training label is 0. This is caused because the first predetermined threshold value is too high, and therefore the first predetermined threshold value will be decreased, resulting in the first threshold value.

A second method 620 to determine the first threshold value will now be described.

The second method 620 starts at step 622 where the first classifier 324 receives the first validation data.

At step 624, a first bilingual evaluation understudy (BLEU) score value is assigned to the first validation translation 606, and a second BLEU score value is assigned to the second validation translation 608. The first and second BLEU score values are determined using a human translated sentence (not shown) associated with the source validation sentence 604. The manner in which the first and second BLEU score values are determined is not limited, and may for example be determined by an algorithm part of the first classifier 324 or not.

At step 626, the first classifier 324 assigns the first score value to the first validation translation 606 based on the set of features associated with the source validation sentence 604, the first validation translation 606, and the second validation translation 608.

At step 628, the first score value assigned to the first validation translation 606 is compared against a second predetermined threshold value. In some embodiments the first predetermined threshold value is the same as the second predetermined threshold value.

At step 630, based on the first score value assigned to the first validation translation 606, the human assessor validates the second predetermined threshold value.

More precisely, the human assessor determines if there is a need to adjust the second predetermined threshold value due to the presence of a second validation error based on the presence of a second validation error based on first score value assigned in step 626 and the first and second BLEU score values assigned in step 624.

For example, the second validation error can occur if the first validation translation 606 has (i) the first score value below the second predetermined threshold value, but (ii) the first BLEU score value is below the second BLEU score value. This is because the second predetermined threshold value is too high, and therefore the second predetermined threshold value will be lowered, resulting in the first threshold value.

Alternatively, another second validation error can occur if the first validation translation sentence has (i) the first score value above the second predetermined threshold value, but (ii) the first BLEU score value is above the second BLEU score value. This is indicative of the second predetermined threshold value being too low, and therefore the second predetermined threshold value will be increased, resulting in the first threshold value.

Needless to say, the first threshold value may be determined using only the first method 602, or the second method 620, or a combination of the first method 602 and the second method 620.

Furthermore, although there is only depicted a single instance of the first validation data, it is done so for ease of illustration. It should be expressly understood that the determination of the first threshold value is done iteratively using a plurality of different sets of the first validation data, and that the determination of adjusting the first and second predetermined threshold values is done, for example, by setting a validation threshold to which a number of validation errors (either the first or second validation error) is compared against.

Now, having described the manner in which the first classifier 324 is trained and the first threshold value is generated (and adjusted) prior to the in-use phase, attention will now be turned to the manner in which the second classifier 326 is trained prior to the in-use phase.

Training the Second Classifier

Figure 5:
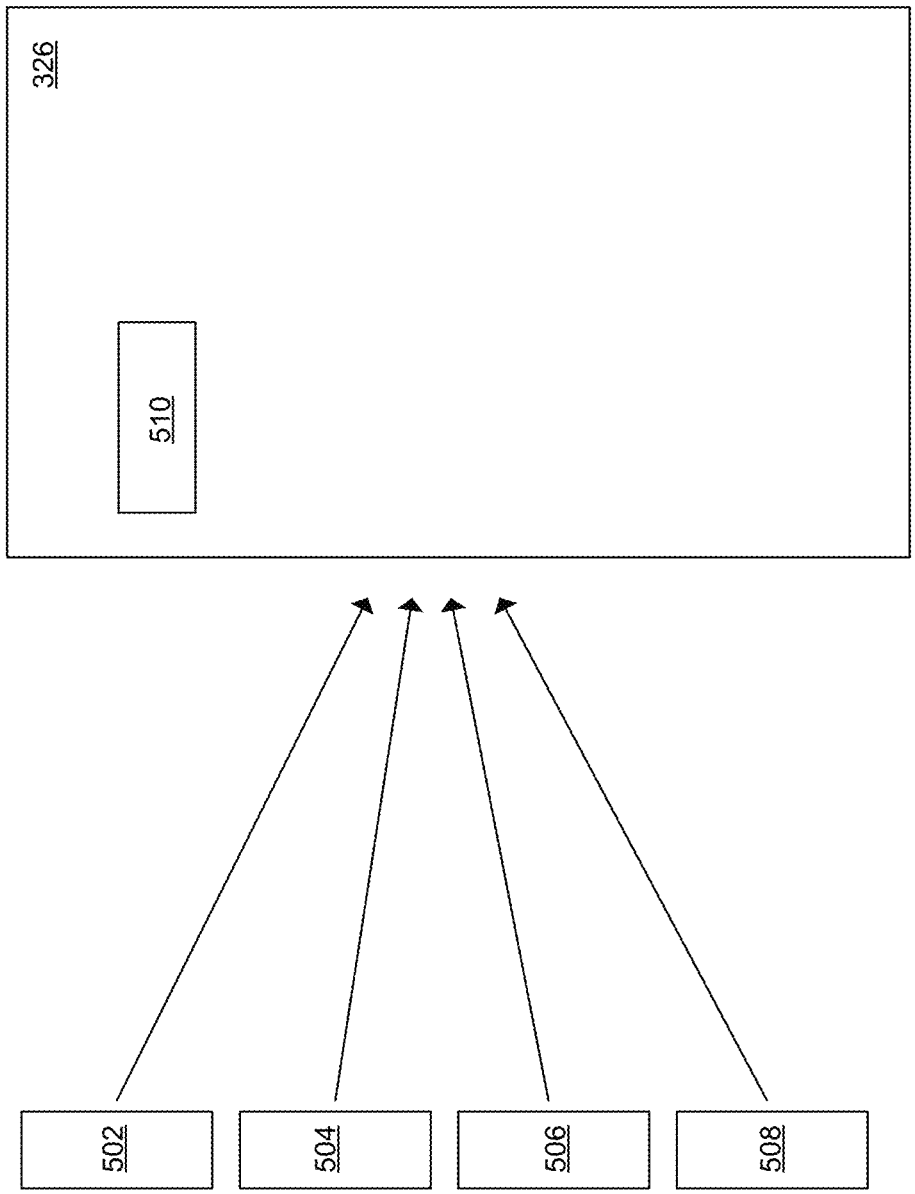
FIG. 5 depicts a schematic diagram of training a second classifier of FIG. 3.

With reference to FIG. 5, there is provided a schematic illustration depicting the training process of the second classifier 326.

As has been alluded to above, the second classifier 326 is trained to assign, during the in-use phase, the second score value to a translation hypothesis generated by the NN translation model 314. The second score value is determined based on an analysis of the source sentence (i.e. the first sentence 206 in the example above), the first translation hypothesis 316 and the second translation hypothesis 320.

The second classifier 326 is trained using a second training data comprising quadruples of data, namely a training source sentence 502, a first training sentence 504, a second training sentence 506, and a human translated sentence 508.

The training source sentence 502 corresponds to a sentence written in the first language. The first training sentence 504 is a translation (in the second language) of the training source sentence 502 generated by the NN translation model 314. The second training sentence 506 is a translation (in the second language) of the training source sentence 502 generated by the PBS translation model 318. The human translated sentence 508 is a translation (in the second language) of the training source sentence 502 generated by a human assessor (not shown). It is assumed that the human translated sentence 508 is a benchmark translation of the training source sentence 502 into the second language.

The second training data is inputted into the second classifier 326 for training thereof. Needless to say, although there is only depicted a single instance of the second training data, it is done so for ease of illustration. It should be expressly understood that the training of the second classifier 326 is done iteratively using a plurality of different sets of the second training data.

Upon receiving the second training data, the second classifier 326 is configured to execute a quality evaluation algorithm 510 to calculate a first translation quality score associated with the first training sentence 504, and a second translation quality score value associated with the second training sentence 506.

The manner in which the quality evaluation algorithm 510 is implemented is not limited, and may for example be implemented as a bilingual evaluation translation (BLEU) algorithm, which is configured to calculate the first and second translation quality scores (as BLEU scores) using the human translated sentence 508.

Using the first and second translation quality scores, the second classifier 326 is configured to calculate a quality difference score value, which corresponds to the difference in the first translation quality score value and the second translation quality score value.

In some embodiments, the quality difference score value is calculated by subtracting the first translation quality score value from the second translation quality score value. Thus, for example, if the first translation quality score value is 0.8, and the second translation quality score value is 0.3, the quality difference score value is −0.5.

In other words, if the quality difference score value is below 0, it is indicative that the translation quality of the first training sentence 504 is above the translation quality of the second training sentence 506. On the other hand, if the quality difference score value is above 0, it is indicative that the translation quality of the first training sentence 504 is below the translation quality of the second training sentence 506. Needless to say, it is also contemplated that the non-limiting embodiments of the present technology may be implemented by subtracting the second translation quality score value from the first translation quality score value in determining the quality difference score value.

As has been alluded to above, the second classifier 326 is configured to determine the quality difference score value iteratively for a plurality of sets of the second training data. Once a predetermined number of quality difference score values has been determined, the second classifier 326 is configured to execute a regression analysis of the respective training source sentence 502, the first training sentence 504, the second training sentence 506 and the associated quality difference score value to generate a second inferred function that is configured to assign the second score value (during the in-use phase) based on the first sentence 206 (i.e. source sentence), the first translation hypothesis 316 and the second translation hypothesis 320.

Needless to say, although the training of the second classifier 326 has been explained with the second classifier 326 being configured to execute the quality evaluation algorithm 510, it is contemplated that the second training data already comprises the quality difference score value associated with the first training sentence 504 and the second training sentence 506. In other words, for the purposes of training the second classifier 326, instead of receiving the (i) training source sentence 502, (ii) the first training sentence 504, (iii) the second training sentence 506 and (iii) the human translated sentence 508 as depicted in FIG. 5, the second classifier 326 may receive the (i) training source sentence 502, (ii) the first training sentence 504, (iii) the second training sentence 506, and the (iv) quality difference score values determined previously by the quality evaluation algorithm 510 executed by another entity other than the second classifier 326.

Returning to FIG. 3 (the in-use phase), the second classifier 326 is configured to assign the second score value, which as explained above, is the expected difference in quality between the first translation hypothesis 316 and the second translation hypothesis 320. As such, if it is determined, based on an analysis of the source sentence (i.e. the first sentence 206), the first translation hypothesis 316 and the second translation hypothesis 320, that the first translation hypothesis 316 is expected to be a better quality translation than the second translation hypothesis 320, the second classifier 326 is configured to assign the second score value indicative as such (i.e. a value closer to −1). Alternatively, if its expected difference is indicative that the second translation hypothesis 320 is a better quality translation that the first translation hypothesis 316, the second classifier 326 is configured to assign the second score value indicative as such (i.e. a value closer to 1).

Having described the manner in which the second classifier 326 is trained, attention will now be directed to the manner in which the second threshold value is determined.

Second Threshold Value

Figure 7:
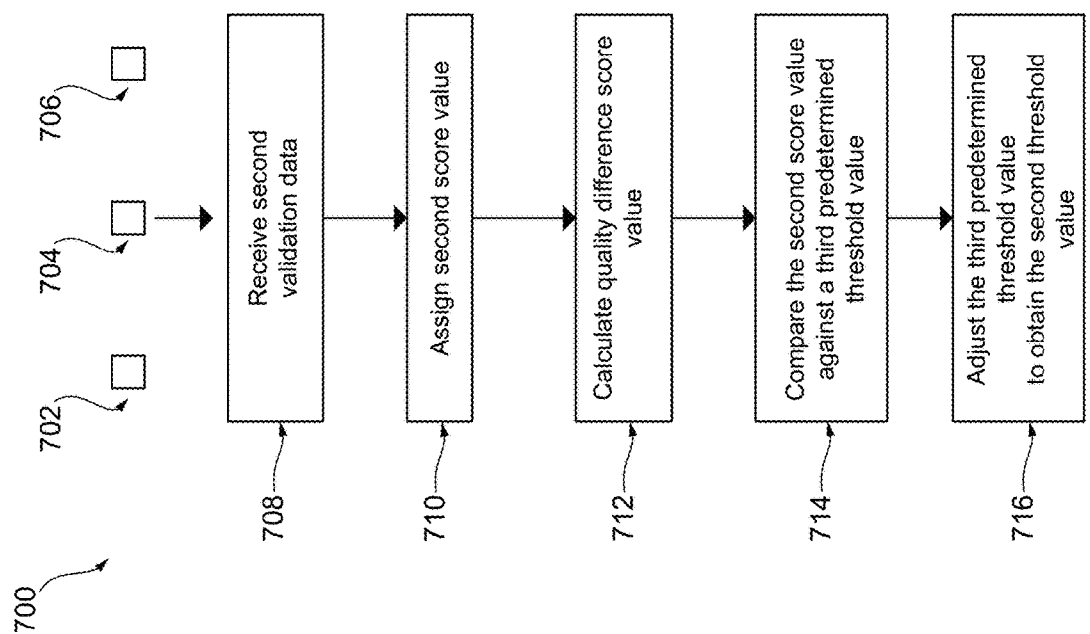
FIG. 7 depicts an example of a method of determining a second threshold value.

As has been alluded to above, the second score value is assigned to the first translation hypothesis 316 by the second classifier 326 and is compared against the second threshold value. With reference to FIG. 7, there is provided a schematic illustration depicting a method 700 for determining the second threshold value. In the illustrated embodiment, the second threshold value is determined empirically.

The method 700 starts at step 708 where the second classifier 326 receives a second validation data. The second validation data comprises (i) a source validation sentence 702 in the first language, (ii) a first validation translation sentence 704, which is the translation of the source validation sentence 702 generated by the NN translation model 314, and (iii) a second validation translation 706 which is the translation of the source validation sentence 702 generated by the PBS translation model 318.

At step 710, the second classifier 326 assigns the second score value to the first validation translation sentence 704 based on the analysis of the source validation sentence 702, the first validation translation sentence 704 and the second validation translation 706.

At step 712, the quality difference score value between the first validation translation sentence 704 and the second validation translation 706 is determined, using the quality evaluation algorithm 510 (see FIG. 5).

At step 714, the second score value assigned to the first validation translation sentence 704 is compared against a third predetermined threshold value. For example, recalling that the second score value is a numerical value between 1 and −1, it may correspond to 0.

At step 716, based on the second score value assigned to the first validation translation sentence 704, the human assessor validates the third predetermined threshold value.

More precisely, the human assessor determines if there is a need to adjust the third predetermined threshold value due to a third validation error (described below) based on the second score value assigned in step 710 and the quality difference score value assigned in step 712.

For example, the third validation error is present if the first validation translation sentence 704 has (i) the second score value above the third predetermined threshold value, and (ii) have the quality difference score value below the third predetermined threshold value. This is caused because the third predetermined threshold value is too high, and therefore the third predetermined threshold value will be lowered, resulting in the second threshold value.

Alternatively, the third validation error is also present if the first validation translation sentence 704 has (i) the second score value below the third predetermined threshold value, and (ii) has the quality difference score value above the third predetermined threshold value. This is caused because the third predetermined threshold value is too low, and therefore the third predetermined threshold value will be increased, resulting in the second threshold value.

Needless to say, although there is only depicted a single instance of the second validation data, it is done so for ease of illustration. It should be expressly understood that the determination of the second threshold value is done iteratively using a plurality of different sets of the second validation data, and that the determination of adjusting the third predetermined threshold is done, for example, by setting a validation threshold to which a number of third validation errors is compared against.

The various non-limiting embodiments of the present technology may allow the translation of a source sentence in a first language into a target sentence in a second language, with an overall better quality, thereby requiring less time and manoeuvre from a user thus resulting in consuming less computation energy.

Although the in-use phase description of the translation application 124 has been done with reference to the server 118, it is not limited as such. It would be understood that the translation application 124 may be implemented within different devices. For example, and not as a limitation, the translation application 124 may be downloaded and stored within the electronic device 102.

Figure 8:
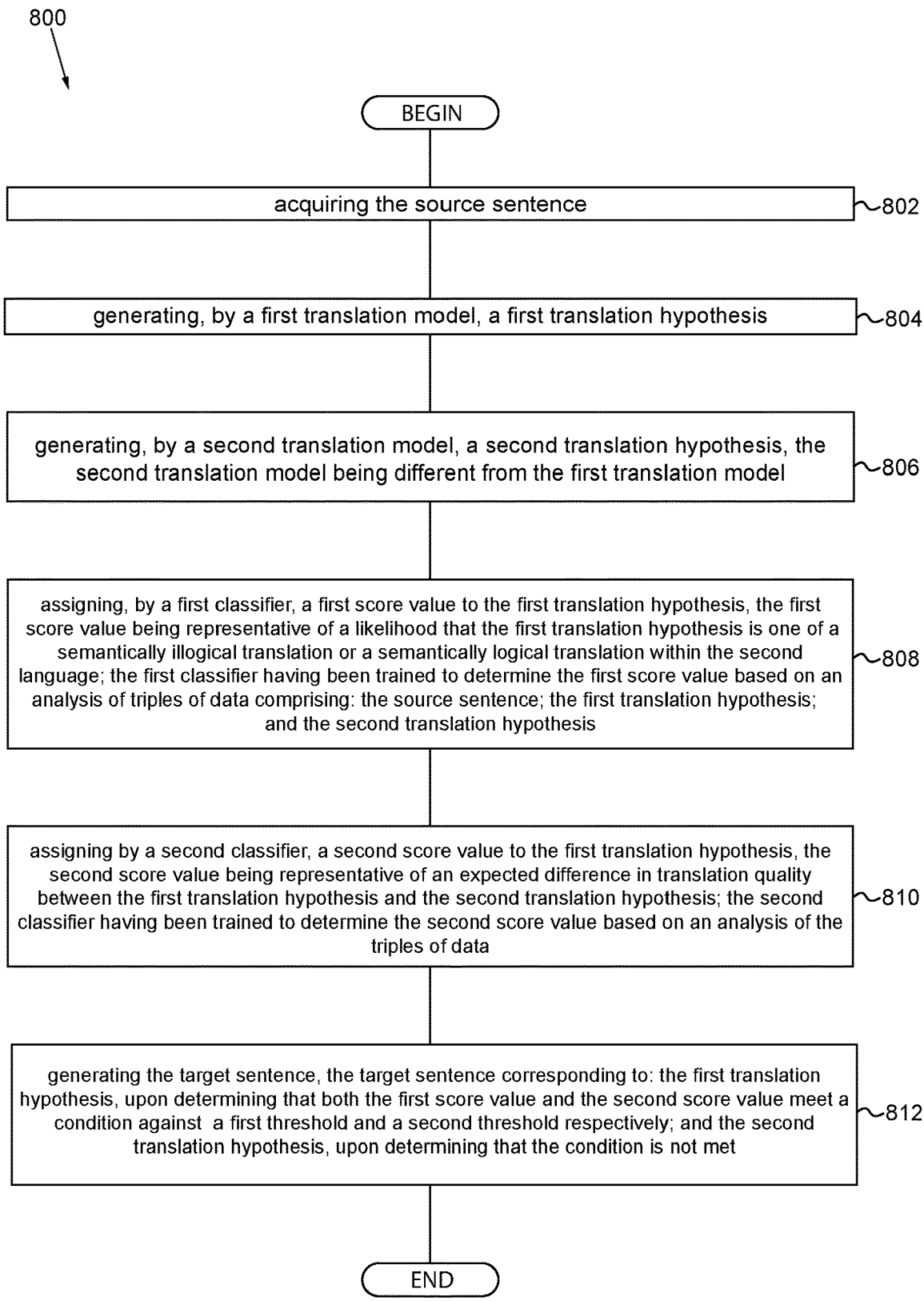
FIG. 8 depicts a block diagram of a flow chart of a method for translating a source sentence in a first language into a target sentence in a second language.

Given the architecture and examples provided hereinabove, it is possible to execute a computer-implemented method for translating a source sentence in a first language into a target sentence in a second language. With reference to FIG. 8, there is depicted a flow chart of a method 800 for translating the source sentence in the first language into the target sentence in the second language, the method 800 being executable in accordance with non-limiting embodiments of the present technology. The method 800 can be executed by the server 118.

Step 802: Acquiring the Source Sentence

The method 800 starts at step 802, where the parsing routine 302 acquires the data packet 310 which comprises the input text 202, from the electronic device 102.

The parsing routine 302 is configured to parse the plurality of sentences 204 into one or more individual sentences, such as the first sentence 206, the second sentence 208, and the third sentence 210.

Once the input text 202 has been parsed into individual sentences, the parsing routine 302 is configured to transmit the data packet 312 to the translation routine 304. The data packet 312 comprises one of the parsed individual sentences, such as for example, the first sentence 206 (which can also be though as a "source sentence").

Step 804: Generating, by a First Translation Model, a First Translation Hypothesis At step 804, the translation routine 304 is configured to execute the NN translation model 314 to generate the first translation hypothesis 316 which corresponds to the first sentence 206 in the second language.

Step 806: Generating, by a Second Translation Model, a Second Translation Hypothesis, the Second Translation Model being Different from the First Translation Model At step 806, the translation routine is configured to execute the PBS translation model 318 to generate the second translation hypothesis 320 which corresponds to the first sentence 206 in the second language.

Step 808: Assigning, by a First Classifier, a First Score Value to the First Translation Hypothesis, the First Score Value being Representative of a Likelihood of the First Translation Hypothesis is One of a Semantically Illogical Translation or a Semantically Logical Translation within the Second Language; the First Classifier Having been Trained to Determine the First Score Value Based on an Analysis of a Triples of Data Comprising: The Source Sentence, the First Translation Hypothesis, and the Second Translation Hypothesis.

At step 808, the classifying routine 306 receives the data packet 322 that comprises the first sentence 206, the first translation hypothesis 316 and the second translation hypothesis 320.

The classifying routine 306 comprises the first classifier 324, which has been previously trained to assign the first score value to the first translation hypothesis 316 based on the set of features associated with the first sentence 206, the first translation hypothesis 316 and the second translation hypothesis 320.

The first score value is a value representative of the likelihood of the first translation hypothesis 316 being one of a semantically illogical translation or a semantically logical translation within the second language.

Step 810: Assigning by a Second Classifier, a Second Score Value to the First Translation Hypothesis, the Second Score Value being Representative of an Expected Difference in Translation Quality Between the First Translation Hypothesis and the Second Translation Hypothesis; the Second Classifier Having been Trained to Determine the Second Score Value Based on an Analysis of the Triples of Data.

At step 810, in addition to executing the first classifier 324, the classifying routine 306 is configured to execute the second classifier 326, which has been previously trained to assign the second score value to the first translation hypothesis based on an analysis of the first sentence 206, the first translation hypothesis 316 and the second translation hypothesis 320.

The second score value is a value representative of the expected difference in translation quality between the first translation hypothesis 316 and the second translation hypothesis 320.

Step 812: Generating the Target Sentence, the Target Sentence Corresponding to: The First Translation Hypothesis, Upon Determining that Both the First Score Value and the Second Score Value Meet a Condition Against a First Threshold and a Second Threshold Respectively; and the Second Translation Hypothesis, Upon Determining that the Condition is not Met.

At step 812, the classifying routine 306 is configured to determine if the first score value and the second score value meet the at least one condition logic 330. The at least one condition logic 330 is met when the first score value is below the first threshold value, and the second score value is below the second threshold value.

In other words, if the first score value is below the first threshold value but the second score value is above the second threshold (or vice-versa), the at least one condition logic 330 is not met.

Upon determining that the at least one condition logic 330 is met, the classifying routine 306 is configured to transmit the data packet 328 which comprises the first translation hypothesis 316 to the text building routine 308. Once the translation of the input text 202 is terminated, the text building routine 308 is configured to transmit to the electronic device 102 the first translation hypothesis 316 as the target sentence in the first sentence 206.

On the other hand, upon determining that the at least one condition logic 330 is not met, the classifying routine 306 is configured to transmit the data packet 328 which comprises the second translation hypothesis 320 to the text building routine 308. Once the translation of the input text 202 is terminated, the text building routine 308 is configured to transmit to the electronic device 102 the second translation hypothesis 320 as the target sentence in the first sentence 206.

It should be apparent to those skilled in the art that at least some embodiments of the present technology aim to expand a range of technical solutions for addressing a particular technical problem encountered by the conventional translation models, namely translating a source sentence from a first language into a target sentence in a second language.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method for translating a source sentence in a first language into a target sentence in a second language, the method executable by a computer device, the method comprising:
   acquiring the source sentence;
   generating, by a first translation model, a first translation hypothesis, the first translation model being a neural network machine translation model;

generating, by a second translation model, a second translation hypothesis, the second translation model being a phrase-based statistical translation model;

assigning, by a first classifier, a first score value to the first translation hypothesis, the first score value being representative of a likelihood that the first translation hypothesis is one of a semantically illogical translation or a semantically logical translation within the second language;

the first classifier having been trained to determine the first score value based on an analysis of triples of data comprising:
the source sentence;
the first translation hypothesis; and
the second translation hypothesis;

assigning, by a second classifier, a second score value to the first translation hypothesis, the second score value being representative of an expected difference in translation quality between the first translation hypothesis and the second translation hypothesis;

the second classifier having been trained to determine the second score value based on an analysis of the triples of data, wherein the second classifier has been trained on at least a quadruples of data comprising:
a first training source sentence in the first language;
a first training sentence, the first training sentence being generated by the first translation model based on the first training source sentence;
a second training sentence, the second training sentence being generated by the second translation model based on the first training source sentence;
a human translated sentence corresponding to the first training source sentence translated into the second language by a human assessor; and wherein
training the second classifier comprises:
calculating a first translation quality score of the first training sentence based on the human translated sentence;
calculating a second translation quality score of the second training sentence based on the human translated sentence;
generating a quality difference score value, the quality difference score value corresponding to a subtraction of the first translation quality score from the second translation quality score;
generating an inferred function configured to assign the second score value, the inferred function being generated based on a regression analysis of the quality difference score value, the first training sentence, the second training sentence, and the first training source sentence;

generating the target sentence, the target sentence corresponding to:
the first translation hypothesis, upon determining that both the first score value and the second score value meet a condition against a first threshold and a second threshold respectively; and
the second translation hypothesis, upon determining that the condition is not met.

2. The method of claim 1, wherein:
determining that both the first score value and the second score value meet the condition against the first threshold and the second threshold respectively comprises:
determining that the first score value is below the first threshold; and
determining that the second score value is below the second threshold.

3. The method of claim 2, wherein the first classifier has been previously trained on a training data comprising at least a training sentence marked as semantically logical or illogical, and is configured to determine if the triples of data are indicative of one of a higher degree of likelihood of the first translation hypothesis being semantically illogical, or a lower degree of likelihood of the first translation hypothesis being semantically illogical within the second language.

4. The method of claim 3, wherein the training sentence is a third training sentence in the second language, and wherein the training data further comprises a second training source sentence in the first language and a fourth training sentence in the second language; and wherein:
the third training sentence is generated by the first translation model based on the second training source sentence;
the fourth training sentence is generated by the second translation model based on the second training source sentence; and
wherein training the first classifier further comprises:
assigning a binary label value to the third training sentence by a human assessor, the binary label value being one of a first binary label value and a second binary label value, the first binary label value being indicative of the third training sentence being semantically illogical, and the second binary label value being indicative of the third training sentence being semantically logical;
generating an inferred function based on the second training source sentence, the third training sentence, the fourth training sentence, and the binary label value assigned to the fourth training sentence, wherein:
the inferred function is configured to assign the first score value to the first translation hypothesis based on the triples of data.

5. The method of claim 4, wherein assigning the first score value to the first translation hypothesis based on the triples of data comprises:
determining a set of features associated with the triples of data, the set of features comprising at least one of:
an alignment feature, the alignment feature being indicative of a lexical correspondence between words contained within the source sentence, the first translation hypothesis and the second translation hypothesis;
a language model score feature, the language model score feature being associated with a language model score assigned to each of the first translation hypothesis and the second translation hypothesis by a language model;
a bilingual phrase table feature, the bilingual phrase table feature being indicative of phrase correspondence between phrases contained within the source sentence, the first translation hypothesis and the second translation hypothesis, each of the phrase correspondence further comprising a co-occurrence likelihood within a parallel corpus;
a repetition feature, the repetition feature being associated with a presence of repetition of a given word within the first translation hypothesis;
a ratio of length feature, the ratio of length feature being associated with a ratio of the length of word sequences in the source sentence and each of the first and second translation hypotheses; and based on the determined set of features, assigning the first score value to the first translation hypothesis.

6. The method of claim 4, wherein the first threshold is predetermined, and wherein the method further comprises adjusting the threshold by:
   receiving a set of source validation sentences in the first language;
   generating, by the first translation model, a set of first validation translation;
   generating, by the second translation model, a set of second validation translation;
   assigning the binary label value to each of the first validation translation in the set of first validation translation by a human assessor;
   assigning the first score value by the first classifier to each of the first threshold translation;
   determining a number of validation errors, the number of validation errors corresponding to the number of first validation translations with the first label value having been assigned a first score value below the predetermined first threshold;
   adjusting to lower the first threshold, upon determining the number of validation errors being above a predetermined validation threshold.

7. The method of claim 1, wherein at least one of the first translation quality score and the second translation quality score is a bilingual evaluation understudy (BLEU) score.

8. The method of claim 1, wherein:
   the computing device is a server coupled to a client device via a communication network;
   acquiring the source sentence comprises receiving the source sentence from the client device; and
   the method further comprises:
   transmitting the target sentence to the client device.

9. A server for translating a source sentence in a first language into a target sentence in a second language, the server comprising a processor configured to:
   acquire the source sentence;
      generate, by a first translation model, a first translation hypothesis, the first translation model being a neural network machine translation model;
      generate, by a second translation model, a second translation hypothesis, the second translation model being a phrase-based statistical translation model;
      assign, by a first classifier, a first score value to the first translation hypothesis, the first score value being representative of a likelihood that the first translation hypothesis is one of a semantically illogical translation or a semantically logical translation within the second language;
         the first classifier having been trained to determine the first score value based on an analysis of triples of data comprising:
            the source sentence;
            the first translation hypothesis; and
            the second translation hypothesis;
      assign by a second classifier, a second score value to the first translation hypothesis, the second score value being representative of an expected difference in translation quality between the first translation hypothesis and the second translation hypothesis;
         the second classifier having been trained to determine the second score value based on an analysis of the triples of data, wherein the second classifier has been trained on at least a quadruples of data comprising:
            a first training source sentence in the first language;
            a first training sentence, the first training sentence being generated by the first translation model based on the first training source sentence;
            a second training sentence, the second training sentence being generated by the second translation model based on the first training source sentence;
            a human translated sentence corresponding to the first training source sentence translated into the second language by a human assessor; and
         wherein
         to train the second classifier, the processor is configured to:
            calculate a first translation quality score of the first training sentence based on the human translated sentence;
            calculate a second translation quality score of the second training sentence based on the human translated sentence;
            generate a quality difference score value, the quality difference score value corresponding to a subtraction of the first translation quality score from the second translation quality score;
            generate an inferred function configured to assign the second score value, the inferred function being generated based on a regression analysis of the quality difference score value, the first training sentence, the second training sentence, and the first training source sentence;
      generate the target sentence, the target sentence corresponding to:
         the first translation hypothesis, upon determining that both the first score value and the second score value meet a condition against a first threshold and a second threshold respectively; and
         the second translation hypothesis, upon determining that the condition is not met.

10. The server of claim 9, wherein:
   to determine that both the first score value and the second score value meet the condition against the first threshold and the second threshold respectively, the processor is configured to:
      determine that the first score value is below the first threshold; and
      determine that the second score value is below the second threshold.

11. The server of claim 10, wherein the first classifier has been previously trained on a training data comprising at least a training sentence marked as semantically logical or illogical, and the processor is configured to determine if the triples of data are indicative of one of a higher degree of likelihood of the first translation hypothesis being semantically illogical, or a lower degree of likelihood of the first translation hypothesis being semantically illogical within the second language.

12. The server of claim 11, wherein the training sentence is a third training sentence in the second language, and wherein the training data further comprises a second training source sentence in the first language and a fourth training sentence in the second language; and wherein:

the third training sentence is generated by the first translation model based on the second training source sentence;
the fourth training sentence is generated by the second translation model based on the second training source sentence; and
wherein to train the first classifier, the processor is further configured to:
assign a binary label value to the third training sentence by a human assessor, the binary label value being one of a first binary label value and a second binary label value, the first binary label value being indicative of the third training sentence being semantically illogical, and the second binary label value being indicative of the third training sentence being semantically logical;
generate an inferred function based on the second training source sentence, the third training sentence, the fourth training sentence, and the binary label value assigned to the fourth training sentence, wherein:
the inferred function is configured to assign the first score value to the first translation hypothesis based on the triples of data.

13. The server of claim 12, wherein to assign the first score value to the first translation hypothesis based on the triples of data, the processor is configured to:
determine a set of features associated with the triples of data, the set of features comprising at least one of:
an alignment feature, the alignment feature being indicative of a lexical correspondence between words contained within the source sentence, the first translation hypothesis and the second translation hypothesis;
a language model score feature, the language model score feature being associated with a language model score assigned to each of the first translation hypothesis and the second translation hypothesis by a language model;
a bilingual phrase table feature, the bilingual phrase table feature being indicative of phrase correspondence between phrases contained within the source sentence, the first translation hypothesis and the second translation hypothesis, each of the phrase correspondence further comprising a co-occurrence likelihood within a parallel corpus;
a repetition feature, the repetition feature being associated with a presence of repetition of a given word within the first translation hypothesis;
a ratio of length feature, the ratio of length feature being associated with a ratio of the length of word sequences in the source sentence and each of the first and second translation hypotheses; and
based on the determined set of features, assign the first score value to the first translation hypothesis.

14. The server of claim 13, wherein the threshold is predetermined, and wherein the processor is further configured to adjust the threshold, the threshold being adjusted by the processor configured to:
receive a set of source validation sentences in the first language;
generate, by the first translation model, a set of first validation translation;
generate, by the second translation model, a set of second validation translation;
assign the binary label value to each of the first validation translation in the set of first validation translation by a human assessor;
assign the first score value by the first classifier to each of the first threshold translation;
determine a number of validation errors, the number of validation errors corresponding to the number of first validation translations with the first label value having been assigned a first score value below the predetermined first threshold;
adjust to lower the first threshold, upon determining the number of validation errors being above a predetermined validation threshold.

15. The server of claim 9, wherein at least one of the first translation quality score and the second translation quality score is a bilingual evaluation understudy (BLEU) score.

16. The server of claim 15, wherein:
the server is coupled to a client device via a communication network, and further comprises a communication interface to acquire the source sentence from the client device via the communication network; and
the processor is further configured to:
transmit the target sentence to the client device.

17. A computer implemented method for translating a source sentence in a first language into a target sentence in a second language, the method executable by a computer device, the method comprising:
acquiring the source sentence;
generating, by a first translation model, a first translation hypothesis, the first translation model being a neural network machine translation model;
generating, by a second translation model, a second translation hypothesis, the second translation model being a phrase-based statistical translation model;
assigning, by a first classifier, a first score value to the first translation hypothesis, the first score value being representative of a likelihood that the first translation hypothesis is one of a semantically illogical translation or a semantically logical translation within the second language;
the first classifier having been trained to determine the first score value based on an analysis of triples of data comprising:
the source sentence;
the first translation hypothesis; and
the second translation hypothesis;
training the first classifier comprises training the first classifier with a training data comprising at least a training sentence marked as semantically logical or illogical, and is configured to determine if the triples of data are indicative of one of a higher degree of likelihood of the first translation hypothesis being semantically illogical, or a lower degree of likelihood of the first translation hypothesis being semantically illogical within the second language; wherein
the training sentence is a first training sentence in the second language, and wherein the training data further comprises a training source sentence in the first language and a second training sentence in the second language; and wherein:
the first training sentence is generated by the first translation model based on the training source sentence;
the second training sentence is generated by the second translation model based on the training source sentence; and wherein training the first classifier further comprises:
assigning a binary label value to the first training sentence by a human assessor, the binary label value being one of a first binary label value and a second binary label value, the first binary label value being indicative of the first training sentence being semantically illogical, and the second binary label value being indicative of the first training sentence being semantically logical;
generating an inferred function based on the training source sentence, first training sentence, the second training sentence, and the binary label value assigned to the second training sentence, wherein:
the inferred function is configured to assign the first score value to the first translation hypothesis based on the triples of data;
assigning, by a second classifier, a second score value to the first translation hypothesis, the second score value being representative of an expected difference in translation quality between the first translation hypothesis and the second translation hypothesis;
the second classifier having been trained to determine the second score value based on an analysis of the triples of data;
generating the target sentence, the target sentence corresponding to:
the first translation hypothesis, upon determining that both the first score value and the second score value meet a condition against a first threshold and a second threshold respectively, the determining comprising: determining that the first score value is below the first threshold and determining that the second score value is below the second threshold; and
the second translation hypothesis, upon determining that the condition is not met.

* * * * *